J. Miller.
Brick Mill.
Nº 87,354. Patented Mar. 2, 1869.

Witnesses,
J. B. Woodruff
Geo. E. Jenks

Inventor,
Joseph Miller

UNITED STATES PATENT OFFICE.

JOSEPH MILLER, OF OLEAN, NEW YORK.

Letters Patent No. 87,354, dated March 2, 1869.

---

IMPROVED MANNER OF FORMING AND PRESSING BRICKS.

---

The Schedule referred to in these Letters Patent and making part of the same.

---

*To all whom it may concern:*

Be it known that I, JOSEPH MILLER, of Olean, in the county of Cattaraugus, and State of New York, have invented certain new and useful Improvements in the Manner of Forming and Pressing Bricks; and the following is a full, clear, and exact description of the same, reference being had to the accompanying drawings, making a part of this specification, in which—

Figure 1:
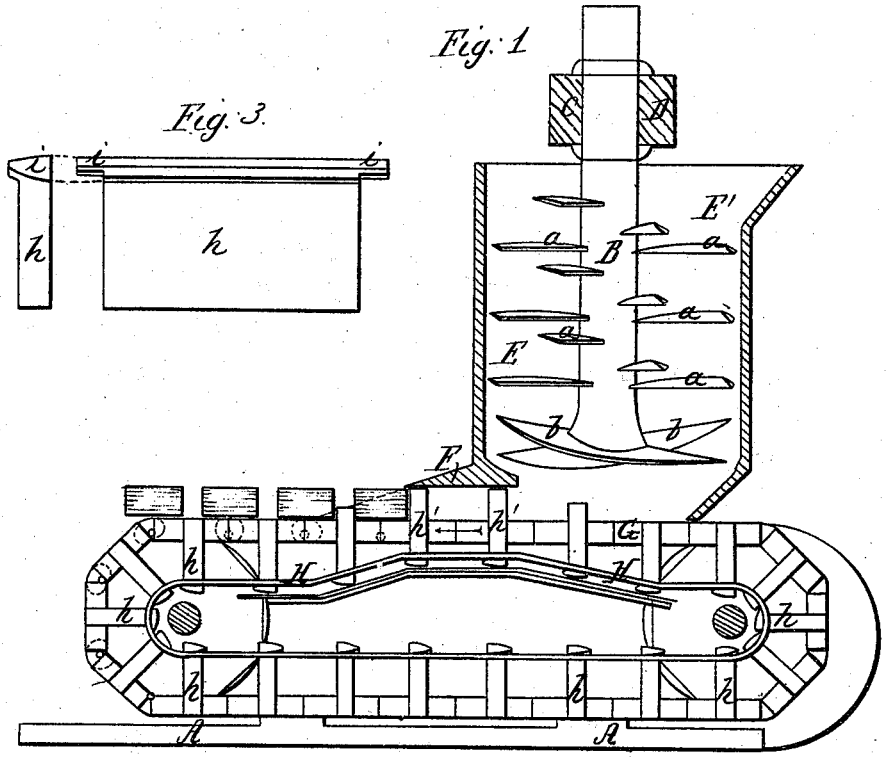
Figure 1 represents a section through the machine, showing the working-mechanism, and the *modus operandi* of forming the brick, and leaving them free to be taken off the endless table.
Figure 3:
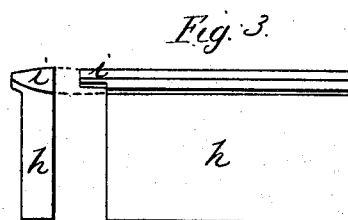
Figure 3 is a side and end view of one of the slides which divide the clay in the receiver, and form and compress it into bricks.

The object of my invention is to form partially-pressed brick, of prepared clay, with greater facility, and more perfectly, without the least danger of crumbling or breaking their corners or edges.

My invention consists in the construction, arrangement, and combination of a series of sliding plates, fitted in and working up through an endless-moving table, which may operate in a direct line, or horizontally in a circle, when the same is connected with a clay-receiver; and a series of blades, for working and tempering the substance; and rotating inclined plates, to force the tempered clay on to the table, to be divided and pressed in laterally through a spout, to form perfect bricks as they pass out, and are liberated by the withdrawal of the slides, and are left loose on the table, to be carried off; also, in the manner of hinging one-half or a portion of the clay-receiver to the vertical frame, so that it can be firmly secured to the other side of the frame when closed, and easily opened, to remove any obstruction, and for cleaning, when necessary.

To enable others to make and use my invention, I will describe it more in detail, referring to the drawings, and to the letters of reference marked thereon.

I make a strong iron frame, A A, of any desired length, with an upright frame at a suitable distance from one end, to attach the vertical shaft B of the mixing and forcing-blades *a a a* and *b b*, which is hung, on one bearing, at the top, in the cross-piece C and box D, above the clay-receiver E, that surrounds it.

The case or shell, which forms the receptacle for grinding and tempering the clay, is made in two semi-circular pieces.

The one, on which the spout F is cast, or may be secured, is firmly fastened to the upright posts of the frame A A.

Figure 2:
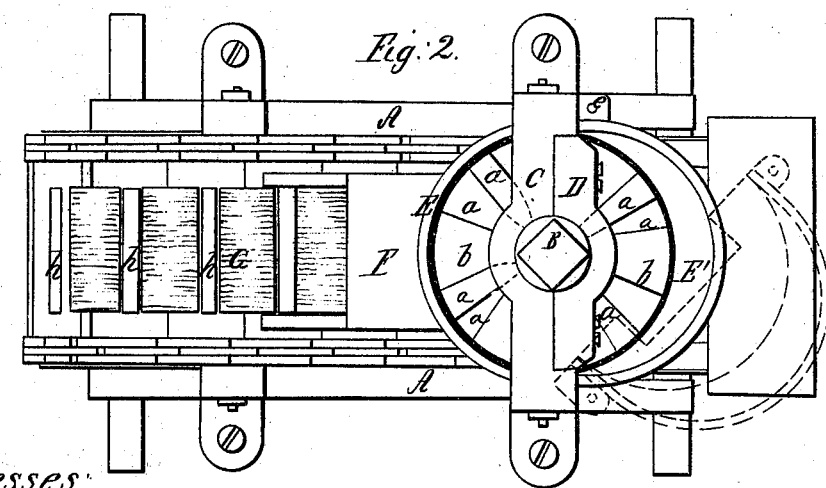
Figure 2 shows a plan or top view of the machine, the clay-receiver and mixer being made to open, as shown in dotted lines.

The other half or portion of the shell E' is cast with lugs, *e e*, on both of its edges, so that it can be hinged to the frame A, and will swing open, as seen in dotted lines in fig. 2, and, when closed up, to form the circle, is firmly held in its place by passing a rod through the ears, *e e*, on the uprights of the frame, and the lugs, *f f*, on the case E'.

The moving table or platform G, on which the clay is pressed, to form the brick as it is forced out through the spout F, which forms the ends and one side or edge of the brick, is made in sections, and hinged together in such a manner as to form a continuous-travelling table, and is supported on ways or truck-rollers on a track near the top of the horizontal portion of the frame A A.

The series of slides *h h h h* may be made of cast or wrought-iron metal, perfectly true and polished, and of sufficient thickness to endure the pressure in forming the brick, they being provided with projecting ears, *i i*, at each end; and one edge is so formed as to travel on a stationary inclined and horizontal way, I, underneath the table G, that they are forced up alternately into the prepared clay in the receiver E, which, by its action to escape, forces the travelling table G along in the direction of the arrow, under the spout F, the only outlet or place for the clay to escape, where, by the action of two of the slides *h' h'*, being up, so as to cut off and fill the opening in the spout, the most perfectly-formed, smooth, pressed brick is produced; and, as it is liberated from the spout, the sides of which extend forward and taper down, the slides *h h* are withdrawn, to the level of the table, by the action of the ears *i i* and guiding-bars H H underneath, thus leaving the brick lying out on the level surface of the travelling table G, with all of its corners and edges perfect, sufficiently hard to be removed and heaped up for drying.

As the bricks thus formed are not in a mould, to be forced out by a plunger, there is no sanding required, and every edge and corner is as solid as the body of the brick, so there will be no breaking or crumbling in removing, if properly handled; and a much finer surface is produced than can be when bricks are made in a sanded mould.

In the accompanying drawings, the bricks are shown to be formed flatways on the table G, but I have demonstrated that it is equally as practicable to form them on the edge.

The spout then being the height of the width of the brick, and the slides placed near enough to form the sides and the thickness of the brick, more slides can be put in a given space, and the power applied to a larger surface, to force them out laterally through the spout F, so that the mill will work faster and easier than when the bricks are formed and delivered flatways upon the travelling table; and, furthermore, the travelling table or platform may be made to form a horizontal circle of any desired dimensions, and two or more clay-tempering and compressing machines may be so arranged and combined with it, so that a number of bricks will be forming at the same time; and, as the table is moved by the forming of the brick, there will be more power applied, and at different places, so that a very large quantity of superior bricks can be made with less machinery, and a less number of hands, than by any other machine that has ever yet come to my knowledge.

What I claim as my invention, and desire to secure by Letters Patent, is—

The sliding plates $h\,h\,h\,h$, fitted in and working up through an endless table, G, being operated by the inclined plate I and guiding-bars H H, in combination with the forming-spout, F, in the receiver E, and the forcing-blades $b\,b$, all operating in the manner as herein described.

JOSEPH MILLER.

Witnesses:
J. B. WOODRUFF,
GEO. C. JENKS.